(12) United States Patent
Iwama

(10) Patent No.: US 9,839,904 B2
(45) Date of Patent: Dec. 12, 2017

(54) METHOD FOR PRODUCING HYDROGENATION CATALYST

(75) Inventor: Marie Iwama, Tokyo (JP)

(73) Assignees: JAPAN OIL, GAS AND METALS NATIONAL CORPORATION, Tokyo (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL & SUMIKIN ENGINEERING CO., LTD., Tokyo (JP)

( * ) Notice: Subject to any disclaimer, the term of this patent is extended or adjusted under 35 U.S.C. 154(b) by 135 days.

(21) Appl. No.: 14/007,711

(22) PCT Filed: Mar. 26, 2012

(86) PCT No.: PCT/JP2012/057775
§ 371 (c)(1),
(2), (4) Date: Dec. 6, 2013

(87) PCT Pub. No.: WO2012/133327
PCT Pub. Date: Oct. 4, 2012

(65) Prior Publication Data
US 2014/0162871 A1  Jun. 12, 2014

(30) Foreign Application Priority Data
Mar. 31, 2011  (JP) .................................. 2011-080652

(51) Int. Cl.
*B01J 29/10* (2006.01)
*B01J 29/16* (2006.01)
(Continued)

(52) U.S. Cl.
CPC .......... *B01J 29/126* (2013.01); *B01J 29/106* (2013.01); *B01J 29/166* (2013.01);
(Continued)

(58) Field of Classification Search
CPC ... B01J 23/42; B01J 23/96; B01J 38/02; B01J 37/08; B01J 37/00; B01J 37/02; C01G 45/10
See application file for complete search history.

(56) References Cited

U.S. PATENT DOCUMENTS 3,344,059 A * 9/1967 Engebretson ............ 208/120.25
4,995,962 A    2/1991 Degnan, Jr. et al.
(Continued)

FOREIGN PATENT DOCUMENTS

AU  2007216008    8/2007
AU  2007231962   10/2007
(Continued)

OTHER PUBLICATIONS

Clark, James H. Rhodes, Christopher N. (2000). Clean Synthesis using Porous Inorganic Solid Catalysts and Supported Reagents, p. 4.*
(Continued)

*Primary Examiner* — Colleen Dunn
(74) *Attorney, Agent, or Firm* — Greenblum & Bernstein, P.L.C.

(57) ABSTRACT

The present invention provides a method for producing a hydroprocessing catalyst including a supporting step of allowing a catalyst support having a content of a carbonaceous substance containing carbon atoms of 0.5% by mass or less in terms of carbon atoms to support an active metal component containing at least one active metal element selected from metals belonging to Group 6, Group 8, Group 9 and Group 10 in the periodic table, to obtain a catalyst
(Continued)

precursor, and a calcining step of calcining the catalyst precursor obtained in the supporting step to obtain the hydroprocessing catalyst.

2 Claims, 2 Drawing Sheets

(51) Int. Cl.
*B01J 37/00* (2006.01)
*B01J 29/12* (2006.01)
*C10G 47/14* (2006.01)
*C10G 65/14* (2006.01)
*C10G 45/10* (2006.01)
*C10G 49/06* (2006.01)
*B01J 21/12* (2006.01)

(52) U.S. Cl.
CPC .......... *B01J 37/0018* (2013.01); *C10G 45/10* (2013.01); *C10G 47/14* (2013.01); *C10G 49/06* (2013.01); *C10G 65/14* (2013.01); *B01J 21/12* (2013.01); *B01J 2229/20* (2013.01); *B01J 2229/42* (2013.01); *C10G 2300/1022* (2013.01)

(56) References Cited

U.S. PATENT DOCUMENTS

| 6,398,950 | B1 | 6/2002 | Iwamoto et al. | |
|---|---|---|---|---|
| 2005/0148456 | A1* | 7/2005 | Dufresne et al. | 502/37 |
| 2014/0124411 | A1 | 5/2014 | Tanaka et al. | |

FOREIGN PATENT DOCUMENTS

| AU | 2007231962 B2 | | 9/2011 |
|---|---|---|---|
| AU | 2007216008 B2 | | 11/2011 |
| CN | 101384686 | | 3/2009 |
| EP | 0 325 438 | | 7/1989 |
| EP | 0325438 | * | 7/1989 |
| JP | 60-23814 | * | 11/1985 |
| JP | S60-238149 | | 11/1985 |
| JP | 1-279993 | | 11/1989 |
| JP | H04-136092 | | 5/1992 |
| JP | 07-108173 | | 4/1995 |
| JP | 2000-000470 | | 1/2000 |
| JP | 2004-323626 | | 11/2004 |
| JP | 2006-297313 | | 11/2006 |
| JP | 2007-511360 | | 5/2007 |
| JP | 2007-211217 | * | 8/2007 |
| JP | 2007-269901 | | 10/2007 |
| JP | 2007-270061 | * | 10/2007 |
| JP | 2008-169355 | | 7/2008 |
| JP | 2012/213712 | | 11/2012 |
| WO | 2011/004690 | | 1/2011 |

OTHER PUBLICATIONS

Regalbuto, John. (2007). Catalyst Preparation—Science and Engineering, p. 237.*
International Preliminary Report on Patentability for PCT/JP2012/057775, dated Oct. 17, 2013.
International Search Report for PCT/JP2012/057775, dated May 29, 2012.
Extended European Search Report for EP Patent Application No. 12765731.0, dated Oct. 5, 2014.
Zefirov, "Catalysts", *The Chemical Encyclopedia*, 1995, along with an English language abstract thereof.

* cited by examiner

METHOD FOR PRODUCING HYDROGENATION CATALYST

TECHNICAL FIELD

The present invention relates to a method for producing a hydroprocessing catalyst.

BACKGROUND ART

Recently, from the viewpoint of increase in environmental consciousness, liquid fuels in which the contents of environmental load substances such as sulfur and aromatic hydrocarbons are small have been demanded. From such a viewpoint, as a technique which can produce a base stock for fuel oil that substantially contains neither sulfur nor aromatic hydrocarbons and is rich in aliphatic hydrocarbons, particularly, a base stock for kerosene and gas oil, a technique called a GTS process (Gas To Liquids) has attracted attention. The GTS process is a method in which synthesis gas containing carbon monoxide gas and hydrogen gas is produced from natural gas by a reforming reaction, this synthesis gas is used as a raw material in a Fischer-Tropsch synthesis reaction (hereinafter, also referred to as the "FT synthesis reaction" in some cases) to produce a hydrocarbon synthetic oil, and the synthetic oil is refined to produce a base stock for fuel oil (see Patent Literature 1, for example).

A synthetic oil obtained by the FT synthesis reaction (hereinafter, also referred to as the "FT synthetic oil" in some cases) is a mixture containing aliphatic hydrocarbons with a wide carbon number distribution as a main component. From this FT synthetic oil, a naphtha fraction containing mainly a component with a boiling point of lower than about 150° C.; middle distillate fraction containing mainly a component with a boiling point of about 150° C. to about 360° C.; and a wax fraction containing mainly a hydrocarbon component heavier than the middle distillate (with a boiling point of higher than about 360° C.) (hereinafter, also referred to as the "FT wax fraction" in some cases) can be obtained.

Among the respective fractions, the middle distillate is the most useful fraction corresponding to a base stock for kerosene and gas oil and is desired to be obtained with a high yield. Therefore, in an upgrading section of hydroprocessing and fractionating the FT synthetic oil to obtain a base stock for fuel oil, the FT wax fraction produced in a significant amount with the middle distillate in the FT synthesis reaction section is converted to a component corresponding to the middle distillate through the hydrocracking to decrease molecular weight, thereby enhancing the yield of the middle distillate as a whole.

The FT wax fraction obtained from the FT synthetic oil by fractionating is hydrocracked in a wax fraction hydrocracking reactor packed with a hydrocracking catalyst, and then separated into gas and liquid in a gas liquid separation apparatus. Then, the liquid component thus obtained (hydrocarbon oil) is sent to a fractionator at the following stage along with the middle distillate preliminarily fractionated from the FT synthetic oil and separately hydrotreated, and the middle distillate (kerosene and gas oil fraction) is obtained by fractionating.

On the other hand, in the FT synthesis reaction, olefins and oxygen-containing compounds containing an oxygen atom derived from carbon monoxide, such as alcohols, are produced as by-products in addition to saturated aliphatic hydrocarbons as a main product, and these by-products (impurities) are contained mainly in the naphtha fraction and the middle distillate obtained by fractionating the FT synthetic oil. Then, when hydrocarbons containing these impurities are used as a fuel, a constituent material for an engine may be damaged and thus these impurities are needed to be removed. This removal of these impurities can be performed by hydrotreating a hydrocarbon oil such as the naphtha fraction and the middle distillate containing the impurities.

Moreover, hydrocarbons produced by the FT synthesis reaction are principally straight-chain aliphatic hydrocarbons, the straight-chain aliphatic hydrocarbons are highly crystalline, and thus a fuel oil containing mainly the straight-chain aliphatic hydrocarbons lacks in cold flow property (fluidity in a low temperature). Therefore, in the middle distillate serving as a base stock for kerosene and gas oil, it is necessary to convert the straight-chain aliphatic hydrocarbons by hydro-isomerizing to branched hydrocarbons to improve the cold flow property. This hydro-isomerizing is generally performed at the same time with hydrotreating.

For a hydrotreating step of hydrotreating including the hydro-isomerizing of the middle distillate, for example, a hydrotreating catalyst is used in which an active metal having hydrogenation activity selected from noble metals belonging to Group 8 to Group 10 in the periodic table is supported by a catalyst support having solid acidity such as zeolite and/or an amorphous composite metal oxide (see Patent Literatures 2 and 3, for example).

CITATION LIST

Patent Literature

[Patent Literature 1] Japanese Patent Application Laid-Open Publication No. 2004-323626
[Patent Literature 2] Japanese Patent Application Laid-Open Publication No. 2008-169355
[Patent Literature 3] Japanese Patent Application Laid-Open Publication No. 2007-269901

SUMMARY OF INVENTION

Technical Problem

In order to industrially perform such a GTL process, it is necessary to produce a catalyst, at a commercial scale, that provides the middle distillate with a high yield as a hydroprocessing catalyst to be used as a hydrocracking catalyst or a hydrotreating catalyst in the upgrading section. However, it has been difficult to precisely control a temperature at a large scale production depending on the types of catalysts, thereby causing aggregation of the active metal and the like in some cases. Then, it has been revealed that the use of the hydroprocessing catalyst, in which such aggregation of the active metal is caused, in the upgrading section of the GTL process decreases the selectivity of the middle distillate in the hydroprocessing product.

Therefore, an object of the present invention is to provide a method for producing a hydroprocessing catalyst that can stably produce a hydroprocessing catalyst which has a high dispersibility of an active metal and can provide a high middle distillate yield, and a hydroprocessing catalyst produced by this method.

Solution to Problem

In order to solve the problem above, the inventors have intensively studied, and as a result have found that conventionally, abnormal heat generation is caused in some cases when a catalyst with an active metal component supported is calcined, and aggregation of the active metal caused by this abnormal heat generation contributes to decrease in middle distillate selectivity of the catalyst, and further have found that the abnormal heat generation is caused by burning of a carbonaceous substance contained in a catalyst support due to catalysis of the active metal component to an oxidization reaction, and these findings have led to complete the present invention.

Namely, the present invention provides a method for producing a hydroprocessing catalyst comprising a supporting step of allowing a catalyst support having a content of a carbonaceous substance containing carbon atoms of 0.5% by mass or less in terms of carbon atoms to support an active metal component containing at least one active metal element selected from metals belonging to Group 6, Group 8, Group 9 and Group 10 in the periodic table, to obtain a catalyst precursor, and a calcining step of calcining the catalyst precursor obtained in the supporting step to obtain the hydroprocessing catalyst.

According to the method for producing a hydroprocessing catalyst of the present invention, the catalyst support having a content of a carbonaceous substance of 0.5% by mass or less in terms of carbon atoms is used in the supporting step, thereby preventing abnormal heat generation from being caused due to the burning reaction of the carbonaceous substance in the calcining step. Therefore, according to the method for producing a hydroprocessing catalyst of the present invention, a hydroprocessing catalyst can be stably produced which has a high dispersibility of an active metal and which is excellent in middle distillate selectivity.

In the method for producing a hydroprocessing catalyst of the present invention, the active metal element is preferably platinum.

As described above, the abnormal heat generation is caused by burning of the carbonaceous substance contained in the catalyst support due to catalysis of the active metal component supported by the catalyst support to an oxidization reaction. Then, since the active metal component containing platinum has a high effect of burning this carbonaceous substance, it is particularly difficult to stably obtain a hydroprocessing catalyst which has a high dispersibility of an active metal when a hydroprocessing catalyst with platinum as an active metal is produced by a conventional production method. In contrast, according to the method for producing a hydroprocessing catalyst of the present invention, even if the active metal element is platinum, the abnormal heat generation is sufficiently suppressed and a hydroprocessing catalyst which has a high dispersibility of an active metal and excellent middle distillate selectivity can be stably produced.

The present invention also provides a hydroprocessing catalyst produced by the production method of the present invention.

Since the hydroprocessing catalyst of the present invention is produced by the production method of the present invention, it has a high dispersibility of an active metal and is excellent in middle distillate selectivity. Therefore, according to the hydroprocessing catalyst of the present invention, a middle distillate rich in branched aliphatic hydrocarbons and excellent in cold flow property can be obtained with a high yield from a feed oil rich in straight-chain aliphatic hydrocarbons, for example.

Advantageous Effects of Invention

According to the present invention, a method for producing a hydroprocessing catalyst that can stably produce a hydroprocessing catalyst which has a high dispersibility of an active metal and is excellent in middle distillate selectivity is provided.

DESCRIPTION OF EMBODIMENTS

Figure 1:
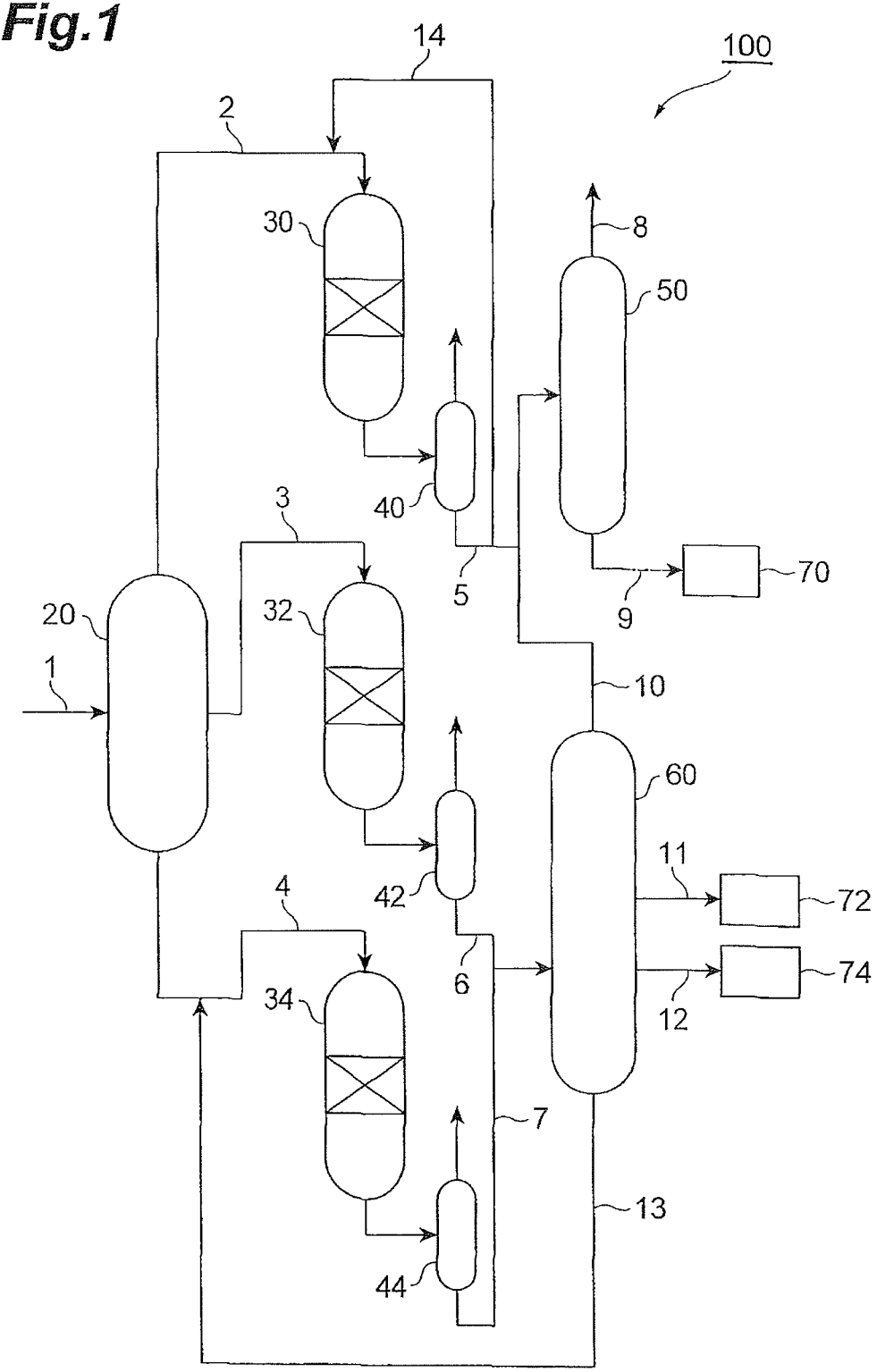
FIG. 1 is a schematic configuration view of an apparatus for producing a hydrocarbon oil in which one embodiment of a method for producing a hydrocarbon oil of the present invention is carried out.

First, a suitable embodiment of a hydroprocessing catalyst of the present invention will be described.

The hydroprocessing catalyst of the present embodiment can be produced by a production method comprising a supporting step of allowing a catalyst support having a content of a carbonaceous substance containing carbon atoms of 0.5% by mass or less in terms of carbon atoms to support an active metal component containing at least one active metal element selected from metals belonging to Group 6, Group 8, Group 9 and Group 10 in the periodic table, to obtain a catalyst precursor, and a calcining step of calcining the precursor obtained in the supporting step to obtain the hydroprocessing catalyst. Here, the periodic table means the long form of the periodic table of the elements, specified by the International Union of Pure and Applied Chemistry (IUPAC).

The hydroprocessing catalyst of the present embodiment can be also used as a hydrocracking catalyst described later and can be also used as a hydrotreating catalyst described later. Hereinafter, a preferable aspect as a hydrocracking catalyst and a preferable aspect as a hydrotreating catalyst will be individually described.

When the hydroprocessing catalyst of the present embodiment is a hydrocracking catalyst, catalyst supports containing crystalline zeolites such as ultra stable Y (USY)-type zeolite, Y-type zeolite, mordenite, and β zeolite, and one or more solid acids selected from amorphous composite metal oxides such as silica alumina, silica zirconia, alumina boria, alumina zirconia, silica titania, and silica magnesia are preferable as the catalyst support.

As the catalyst support of the hydrocracking catalyst, catalyst supports containing USY-type zeolite and one or more selected from silica alumina, alumina boria, and silica zirconia are more preferable, and catalyst supports containing USY-type zeolite and one or more selected from alumina boria and silica alumina are still more preferable.

USY-type zeolite is one obtained by ultra-stabilizing Y-type zeolite by a hydrothermal treatment and/or an acid treatment; in addition to a fine porous structure called micro pores that Y-type zeolite originally has and whose pore size is not larger than 2 nm, new pores having a pore size in the range of 2 to 10 nm are formed. The average particle size of USY-type zeolite is not particularly limited, but it is preferably not larger than 1.0 μm, and more preferably not larger than 0.5 μm. Moreover, in USY-type zeolite, it is preferable that a molar ratio of silica/alumina (molar ratio of silica to alumina) be 10 to 200, and it is more preferable that the molar ratio be 15 to 100, and it is still more preferable that the molar ratio be 20 to 60.

Moreover, it is preferable that the catalyst support of the hydrocracking catalyst be constituted by containing 0.1 to 80% by mass of crystalline zeolite and 0.1 to 60% by mass of an amorphous composite metal oxide.

In order to enhance the moldability and mechanical strength of the catalyst support of the hydrocracking catalyst, a binder may be compounded in the catalyst support. Examples of a preferable binder include alumina, silica, and magnesia. The amount of the binder to be compounded to the catalyst support is not particularly limited, but it is preferably 20 to 98% by mass, and more preferably 30 to 96% by mass based on the entire mass of the catalyst support.

The catalyst support of the hydrocracking catalyst is preferably molded. The shape of the molded catalyst support is not particularly limited, but examples thereof include spherical shape, cylindrical shape, deformed cylindrical shape with trilobed or quadrolobed cross section, or disk shape. A method for molding the catalyst support is not limited, and a known method such as extrusion molding and tablet molding is used. The molded catalyst support is usually calcined.

The active metal element in the hydrocracking catalyst is preferably at least one selected from metals belonging to Group 8 to Group 10 in the periodic table. Examples of the suitable active metal element include cobalt, nickel, rhodium, palladium, iridium, and platinum. Among them, at least one selected from nickel, palladium, and platinum is more preferably used, at least one selected from palladium and platinum is still more preferably used, and platinum is particularly preferably used. Also from the viewpoint of oxidization catalysis of the active metal that allows the carbonaceous substance to be burned in calcining of the catalyst precursor to induce the abnormal heat generation, the catalysis of platinum and palladium is large, and that of platinum is particularly large.

In the case where the active metal element to be supported by the catalyst support in the hydrocracking catalyst is a metal other than noble metals such as cobalt and nickel, it is preferable that the content of the active metal element be 2 to 50% by mass in terms of a metal oxide based on the entire mass of the catalyst support. In addition, in the case where the active metal element to be supported by the catalyst support in the hydrocracking catalyst is a noble metal such as platinum, palladium, rhodium, and iridium, it is preferable that the content of the active metal element be 0.1 to 3.0% by mass in terms of a metal atom based on the entire mass of the catalyst support. In the case where the content of the active metal element is less than the lower limit value, hydrocracking tends not to sufficiently proceed. On the other hand, in the case where the content of the active metal element is more than the upper limit value, dispersion of the active metal element tends to be decreased to decrease the activity of the catalyst, and cost of the catalyst is increased.

When the hydroprocessing catalyst of the present embodiment is a hydrotreating catalyst, catalyst supports containing a metal oxide such as alumina, silica, titania, zirconia, and boria are preferable as the catalyst support. Moreover, the catalyst support of the hydrotreating catalyst may be a catalyst support containing a composite metal oxide such as silica alumina, silica zirconia, alumina boria, alumina zirconia, silica titania, and silica magnesia.

From the viewpoint of allowing hydro-isomerizing of straight-chain aliphatic hydrocarbons to efficiently proceed at the same time with hydrotreating, it is preferable that the catalyst support of the hydrotreating catalyst contain a composite metal oxide having solid acidity such as silica alumina, silica zirconia, alumina zirconia, and alumina boria. Moreover, a small amount of zeolite may be contained in the catalyst support.

In order to enhance the moldability and mechanical strength of the catalyst support of the hydrotreating catalyst, a binder may be compounded in the catalyst support. Examples of a preferable binder include alumina, silica, and magnesia. The amount of the binder to be compounded to the catalyst support is not particularly limited, but it is preferably 20 to 98% by mass, and more preferably 30 to 96% by mass based on the entire mass of the catalyst support.

The catalyst support of the hydrotreating catalyst is preferably molded. The shape of the molded catalyst support is not particularly limited, but examples thereof include deformed cylindrical shape and disk shape with a spherical, cylindrical, or trefoil•quatrefoil cross section. A method for molding the catalyst support is not limited, and a known method such as extrusion molding and tablet molding is used. The molded catalyst support is usually calcined.

The active metal element in the hydrotreating catalyst is preferably at least one selected from metals belonging to Group 6, Group 8, Group 9, and Group 10 in the periodic table. Examples of the suitable active metal element include noble metals such as platinum, palladium, rhodium, ruthenium, iridium, and osmium, or cobalt, nickel, molybdenum, tungsten, and iron; platinum, palladium, nickel, cobalt, molybdenum, and tungsten are preferable, platinum and palladium are more preferable, and platinum is particularly preferable. Moreover, a plurality of these metals are also preferably used in combination; examples of a preferable combination in this case include platinum-palladium, cobalt-molybdenum, nickel-molybdenum, nickel-cobalt-molybdenum, and nickel-tungsten.

In the case where the active metal element supported by the catalyst support in the hydrotreating catalyst is a noble metal, it is preferable that the content of the active metal element be 0.1 to 3.0% by mass in terms of a metal atom based on the entire mass of the catalyst support. Moreover, in the case where the active metal element supported by the catalyst support in the hydrotreating catalyst is a metal other than noble metals, it is preferable that the content of the active metal element be 2 to 50% by mass in terms of a metal oxide based on the entire mass of the catalyst support. In the case where the content of the active metal element is less than the lower limit value, hydrotreating and hydro-isomerizing tend not to sufficiently proceed. On the other hand, in the case where the content of the active metal element is more than the upper limit value, dispersion of the active metal element tends to be decreased to decrease the activity of the catalyst, and cost of the catalyst is increased.

Next, one aspect of a method for producing the hydroprocessing catalyst of the present embodiment will be described below.

The production method of the present aspect comprises a supporting step of allowing a catalyst support having a content of a carbonaceous substance containing carbon atoms of 0.5% by mass or less in terms of carbon atoms to support an active metal component containing an active metal element, to obtain a catalyst precursor, and a calcining step of calcining the catalyst precursor obtained in the supporting step to obtain the hydroprocessing catalyst. First, a step of preparing the catalyst support will be described below.

The catalyst support can be produced by molding a kneaded product containing a metal oxide and a molding additive, and calcining it, for example. The kneaded product is prepared by kneading a mixture containing a metal oxide and a molding additive, and a binder, water, and the like can be compounded thereto, if necessary.

Here, the molding additive is an organic compound to be compounded for enhancing the moldability of the kneaded product and the mechanical strength of the obtained molded catalyst support. The molding additive is not particularly limited, but it is preferably an organic compound having a high molecular weight such as crystalline cellulose, methylcellulose, carboxymethyl cellulose, hydroxyethyl cellulose, polyvinyl alcohol, starch, and lignin in order to sufficiently obtain an effect of compounding the molding additive.

This molding additive is mostly removed in calcining of the catalyst support described later, but a carbonaceous substance from the molding additive may remain in an amount of more than 0.5% by mass in terms of carbon atoms in a conventional production of a hydroprocessing catalyst. Then, the carbonaceous substance from the molding additive contributes to the abnormal heat generation in calcining of the catalyst precursor described later. Therefore, it is preferable in the production method of the present aspect that conditions of calcining the catalyst support and an amount of the molding additive to be used be appropriately adjusted in order to prepare a catalyst support in which a content of a carbonaceous substance is 0.5% by mass or less in tennis of carbon atoms.

The amount of the molding additive to be compound is preferably 0.5 to 15% by mass and more preferably 1 to 10% by mass based on the entire mass of an inorganic compound (metal oxide and binder) that constitutes the catalyst support.

Next, the kneaded product is extrusion molded to obtain a mold, and further this mold is dried at 70 to 150° C., for example.

Next, the dried mold is calcined to obtain a catalyst support. In this case, the calcining conditions are selected so that the mechanical strength of the catalyst support obtained by calcining is sufficiently exerted and an amount of the carbonaceous substance containing carbon atoms from the molding additive on the catalyst support is 0.5% by mass or less. Here, the carbonaceous substance containing carbon atoms from the molding additive means a carbonaceous substance containing carbon atoms or carbon atoms and hydrogen atoms, and/or oxygen atoms, or the like, that is produced by decomposing the molding additive through so-called "carbonization" such as oxidative dehydrogenation in calcining of the catalyst support. It is to be noted that in the production method of the present aspect, the carbonaceous substance is not necessarily limited to that from the molding additive, and encompasses a carbonaceous substance from an organic compound other than the molding additive as long as it is a compound measured by a quantitation method described later.

A variety of combinations of a calcining temperature and a calcining time can be set as the conditions for calcining the catalyst support to satisfy the requirements. In this case, it is preferable to consider the amount of the molding additive to be compounded. For example, the calcining temperature is preferably in the range of 300 to 550° C., and more preferably in the range of 350 to 500° C. Moreover, the calcining time is preferably in the range of about 0.1 to 10 hours, and more preferably in the range of about 0.2 to 8 hours.

It is to be noted that as the quantitation method of the carbonaceous substance in the hydroprocessing catalyst, a method is employed in which a sample of the hydroprocessing catalyst is burned by heating in a stream of oxygen at a high frequency wave and carbon dioxide in burning gas is quantified by a detector using infrared absorption (for example, carbon/sulfur analyzer EMIA-920V manufactured by HORIBA, Ltd.).

Then, a compound containing the active metal element (active metal component) is supported by the catalyst support obtained as described above. The active metal component to be used for supporting is not particularly limited as long as it contains the active metal element, and a known compound is used therefor, but an inorganic or organic compound soluble in a solvent, in particular, water is used therefor. Specific examples of the active metal component include $RuCl_3$ when the active metal element is ruthenium; $OsCl_3.3H_2O$ and $(NH_4)_2[OsCl_6]$ when the active metal element is osmium; $RhCl_3.3H_2O$ when the active metal element is rhodium; $H_2IrCl_6.6H_2OH$ when the active metal element is iridium; $(NH_4)_2PdCl_6$, $Pd(NH_3)_4Cl_2.H_2O$, and $Pd(C_2H_5CO_2)_2$ when the active metal element is palladium; and $PtCl_2$, $H_2PtCl_6$, $(NH_4)_2PtCl_6$, $H_2Pt(OH)_6$, $Pt(NH_3)_4Cl_2.H_2O$, and $Pt(C_5H_7O_2)_2$ when the active metal element is platinum.

These active metal components can be supported by a known method. Namely, a method in which the molded catalyst support is immersed in or ion exchanged by a solution, preferably an aqueous solution of the active metal component is preferably used. The immersing method is not particularly limited and an incipient wetness method or the like is preferably used.

Next, the catalyst support by which the active metal component is supported by the above-described method is dried. The catalyst support can be dried at a temperature of about 70 to 150° C., for example.

The thus-obtained catalyst support by which the active metal component is supported (hereinafter, also referred to as the "catalyst precursor" in some cases) is calcined to obtain the hydroprocessing catalyst of the present embodiment. When the catalyst precursor is calcined, components other than an active metal atom, namely counterion, ligand and the like are removed from the compound containing the active metal element supported by the catalyst support.

A variety of combinations of a calcining temperature and a calcining time can be set as conditions for calcining the catalyst precursor. For example, the calcining temperature is preferably in the range of 300 to 550° C., and more preferably in the range of 350 to 530° C. Moreover, the calcining time is preferably in the range of about 0.1 to 10 hours, and more preferably in the range of about 0.2 to 8 hours.

Here, provided that the carbonaceous substance contained in the catalyst support is not focused on, it is necessary in order to suppress the abnormal heat generation in calcining of the catalyst precursor that the calcining conditions are devised, for example, that a rate of temperature rise is sufficiently small so as not to cause a rapid burning reaction during raising a temperature, and that the catalyst precursor is calcined at a two-stage. On the other hand, in the production method of the present aspect, it is not necessary that the calcining conditions are thus devised, and the abnormal heat generation is suppressed to thereby decrease a time and load taken for the calcining step.

As described above, the hydroprocessing catalyst of the present embodiment can be obtained.

Next, a method for producing a hydrocarbon oil of the present invention will be described. In the method for producing a hydrocarbon oil of the present invention, hydrotreating and/or hydrocracking are performed by the hydroprocessing catalyst of the present invention.

Hereinafter, along with examples of the GTL process in which the method for producing a hydrocarbon oil of the present invention is preferably used, an embodiment of the method for producing a hydrocarbon oil of the present invention will be described.

FIG. 1 is a schematic configuration view of a production facility corresponding to an upgrading unit in the GTL process, including an apparatus for producing a hydrocarbon oil in which one embodiment of the method for producing a hydrocarbon oil of the present invention is carried out.

First, with reference to FIG. 1, an apparatus will be described in which a suitable embodiment of the method for producing a hydrocarbon oil of the present invention is carried out, and naphtha and a base stock for kerosene and gas oil are produced from hydrocarbons (FT synthetic oil) obtained by the FT synthesis reaction.

To an apparatus for producing a hydrocarbon oil 100 shown in FIG. 1 is fed with a FT synthetic oil through a line 1 from a FT synthesis reaction apparatus (not shown) for synthesizing a hydrocarbon oil (FT synthetic oil) by the FT synthesis reaction, by using synthesis gas (mixed gas of carbon monoxide gas and hydrogen gas) as a raw material. It is to be noted that the FT synthesis reaction apparatus is fed with synthesis gas from a reforming reaction apparatus (not shown) for reforming natural gas to produce synthesis gas.

The apparatus for producing a hydrocarbon oil 100 comprises mainly a first fractionator 20 of fractionating a FT synthetic oil to a raw naphtha fraction, a raw middle distillate and a raw wax fraction, a naphtha fraction hydrotreating reaction apparatus 30 of hydrotreating the raw naphtha fraction fed from the top of the first fractionator 20 by a line 2, a middle distillate hydrotreating reactor 32 of hydrotreating and hydro-isomerizing the raw middle distillate fed from the middle of the first fractionator 20 by a line 3, a wax fraction hydrocracking reactor 34 of hydrocracking the raw wax fraction fed from the bottom portion of the first fractionator 20 by a line 4, and a second fractionator 60 of fractionating a hydrotreating product of the middle distillate and a hydrocracking product of the wax fraction.

Here, the naphtha fraction is a fraction of hydrocarbons (approximately $C_5$ to $C_{10}$) with a boiling point of approximately 25° C. or higher and lower than approximately 150° C., the middle distillate is a fraction of hydrocarbons (approximately $C_{11}$ to $C_{21}$) with a boiling point of approximately 150 to 360° C., and the wax fraction is a fraction of hydrocarbons (approximately $C_{22}$ or more) with a boiling point of higher than approximately 360° C. Moreover, each of the raw naphtha fraction, the raw middle distillate and the raw wax fraction means each of the above-described fractions that do not undergo hydrotreating and hydrocracking, and that contain olefins and oxygen-containing compounds such as alcohols which are impurities (by-products of the FT synthesis reaction) other than saturated aliphatic hydrocarbons (paraffins).

The inside of the middle distillate hydrotreating reactor 32 is preferably packed with a hydrotreating catalyst as a fixed bed. The hydrotreating catalyst may be the hydroprocessing catalyst of the above-described present embodiment. The raw middle distillate fed by the line 3 is mixed with hydrogen gas fed by a hydrogen gas feed line (not shown) connected to the line 3, heated to a reaction temperature by a heating device (not shown) such as a heat exchanger provided on the line 3, and thereafter fed to the middle distillate hydrotreating reactor 32 and subjected to hydrotreating including hydro-isomerizing.

The naphtha fraction hydrotreating reaction apparatus 30 is preferably packed with a hydrotreating catalyst as a fixed bed. The hydrotreating catalyst may be the hydroprocessing catalyst of the above-described present embodiment. The raw naphtha fraction fed by the line 2 is mixed with hydrogen gas fed by hydrogen gas feed line (not shown) connected to the line 2, heated to a reaction temperature by a heating device (not shown) such as a heat exchanger provided on the line 2, and thereafter fed to the naphtha fraction hydrotreating reactor 30 and hydrotreated.

The wax fraction hydrocracking reactor 34 is preferably packed with a hydrocracking catalyst as a fixed bed. The hydrocracking catalyst may be the hydroprocessing catalyst of the above-described present embodiment. The raw wax fraction fed by the line 4 is mixed with an uncracked wax (described later in detail) recycled by a line 13 connected to the line 4 and hydrogen gas fed by a hydrogen gas feed line (not shown) connected to the line 4, heated to a reaction temperature by a heating device (not shown) such as a heat exchanger provided on the line 4, and thereafter fed to the wax fraction hydrocracking reactor 34 and hydrocracked.

The apparatus for producing a hydrocarbon oil 100 comprises gas liquid separators 40, 42 and 44 downstream of the naphtha fraction hydrotreating reaction apparatus 30, the middle distillate hydrotreating reaction apparatus 32 and the wax fraction hydrocracking reactor 34, respectively, and these separators separate liquid hydrocarbons which are a hydrotreating product or a hydrocracking product ejected from each of the reaction apparatuses and a gaseous component containing unreacted hydrogen gas and gaseous hydrocarbons into gas and liquid. Moreover, each of the gas liquid separators is accompanied with an apparatus (not shown) for ejecting water as a by-product of hydrotreating or hydrocracking.

The apparatus for producing a hydrocarbon oil 100 comprises a naphtha stabilizer 50 downstream of the gas liquid separator 40, the naphtha stabilizer ejecting gaseous hydrocarbons containing hydrocarbons with a number of carbon atoms of 4 or less as a main component from the hydrotreated naphtha fraction fed via a line 5 from a line 8 connected to the top thereof. Moreover, the naphtha fraction from which the gaseous hydrocarbons are removed is fed by a line 9 from the bottom of the naphtha stabilizer 50 in which a naphtha tank 70 for storing this naphtha fraction is provided.

The second fractionator 60 is provided downstream of the gas liquid separator 42 and the gas liquid separator 44, to which the hydrotreated middle distillate fed via a line 6 from the gas liquid separator 42 and the hydrocracking product of the wax fraction fed via a line 7 from the gas liquid separator 44 are fed, and fractionates a mixture of them. The second fractionator 60 is provided with a line 11 connected to the middle thereof, for discharging a fractionated kerosene fraction and transferring it to a kerosene tank 72; and a line 12 connected to the lower portion thereof, for discharging a fractionated gas oil fraction and transferring it to a gas oil tank 74. Moreover, the second fractionator 60 is connected to the line 13 in the bottom thereof, for discharging a bottom oil of the second fractionator 60 containing as a main component an uncracked wax which has not been sufficiently cracked in the wax fraction hydrocracking reaction apparatus 34 and recycling it to the line 4 upstream of the wax fraction hydrocracking reaction apparatus 34. Further, the second fractionator 60 is connected to a line 10 in the top thereof, for discharging light hydrocarbons containing the naphtha fraction as a main component, and feeding it to the naphtha stabilizer 50.

Next, hydrotreating of the middle distillate will be described with reference to FIG. 1.

The FT synthetic oil fed by the FT synthesis reaction apparatus (not shown) through the line 1 is fractionated in the first fractionator 20 to the raw naphtha fraction, the raw middle distillate and the raw wax fraction. The raw middle distillate obtained by fractionating is discharged from the middle of the first fractionator 20 by the line 3. The middle distillate is generally a fraction containing a mixture of hydrocarbons (approximately $C_{11}$ to $C_{21}$) with a boiling point of approximately 150 to 360° C. The raw middle distillate obtained by fractionating the FT synthetic oil contains, as a main component, straight-chain saturated aliphatic hydrocarbons having the above-described boiling point range, and, as impurities, olefins and oxygen-containing compounds such as alcohols which are by-products of the FT synthesis reaction. The raw middle distillate is mixed with hydrogen gas and also heated to a reaction temperature, and fed to the middle distillate hydrotreating reaction apparatus 32. The reaction apparatus is packed with a hydrotreating catalyst (preferably, the hydroprocessing catalyst of the present embodiment), and in the reaction apparatus, hydrotreating and hydro-isomerizing of the raw middle distillate proceed by bringing a mixture of the raw middle distillate and hydrogen gas into contact with the catalyst.

The hydrotreating of the raw middle distillate is a reaction in which impurities (olefins and oxygen-containing compounds such as alcohols) contained in the raw middle distillate are removed. The olefins (unsaturated aliphatic hydrocarbons) is hydrogenated and converted to saturated aliphatic hydrocarbons (paraffins). Moreover, the oxygen-containing compounds such as alcohols are hydro-deoxidized and converted to saturated aliphatic hydrocarbons, water and the like.

In the hydro-isomerizing, straight-chain saturated aliphatic hydrocarbons (normal paraffins) are skeletal isomerized and converted to branched saturated hydrocarbons (isoparaffins). By the hydro-isomerizing, the content of the normal paraffins in the middle distillate is decreased and the content of the isoparaffins is increased, and thus crystallinity of the paraffins is lowered and the cold flow property as a fuel oil is enhanced. As one index to determine to what extent hydro-isomerizing proceeds, for example, a ratio of branched octadecane (isooctadecane) in hydrocarbons with a number of carbon atoms of 18 ($C_{18}$, octadecane) (100× mass of isooctadecane/entire mass of octadecane (%), hereinafter, referred to as the "$C_{18}$ isomer ratio") can be used. In order to satisfy the cold flow property as a base stock for gas oil, for example, it is preferable that the $C_{18}$ isomer ratio be 85% or higher.

In the present embodiment, for example, in order to perform the hydro-isomerizing so that the extent to which hydro-isomerizing proceeds represented by the $C_{18}$ isomer ratio satisfies the standard, the middle distillate hydrotreating reaction apparatus 32 is mainly operated while a reaction temperature thereof being adjusted.

The reaction temperature in the middle distillate hydrotreating reaction apparatus 32 is 180 to 400° C., preferably 200 to 370° C., still more preferably 250 to 350° C., and particularly preferably 280 to 340° C. Here, the reaction temperature refers to a weight average temperature of the catalyst bed in the middle distillate hydrotreating reaction apparatus 22. If the reaction temperature is higher than 400° C., not only cracking into the light fraction tends to proceed to decrease the yield of the middle distillate, but also the product tends to be colored and to be restricted for use as the base stock for fuel oil. On the other hand, if the reaction temperature is lower than 180° C., oxygen-containing compounds such as alcohols tend not to sufficiently be removed to remain, and production of isoparaffins by the hydro-isomerizing reaction tends to be suppressed.

A pressure (hydrogen partial pressure) in the middle distillate hydrotreating reaction apparatus 22 is preferably 0.5 to 12 MPa, and more preferably 1 to 5 MPa. If the pressure is lower than 0.5 MPa, hydrotreating and hydro-isomerizing tend not to sufficiently proceed, on the other hand, if the pressure is higher than 12 MPa, high pressure resistance is demanded for the apparatus, and facility cost tends to be increased.

A liquid hourly space velocity (LHSV) in the middle distillate hydrotreating reaction apparatus 22 is preferably 0.1 to 10 h$^{-1}$, and more preferably 0.3 to 3.5 h$^{-1}$. If the LHSV is lower than 0.1 h$^{-1}$, cracking into the light fraction tends to proceed to decrease the yield of the middle distillate, and productivity tends to be decreased, on the other hand, if the LHSV is more than 10.0 h$^{-1}$, hydrotreating and hydro-isomerizing tend not to sufficiently proceed.

The ratio of hydrogen gas/oil in the middle distillate hydrotreating reaction apparatus 32 is preferably 50 to 1000 NL/L, and more preferably 70 to 800 NL/L. Here, "NL" means a hydrogen capacity (L) at the normal state (0° C., 101325 Pa). If the ratio of hydrogen gas/oil is lower than 50 NL/L, hydrotreating and hydro-isomerizing tend not to sufficiently proceed, on the other hand, if it is more than 1000 NL/L, a large-sized hydrogen feeding apparatus and the like tend to be needed.

In the middle distillate hydrotreating reaction apparatus 32, as described above, the hydro-isomerizing reaction is performed in which straight-chain saturated aliphatic hydrocarbons (normal paraffins) as a main component of the raw middle distillate are converted to branched saturated hydrocarbons (isoparaffins), and in order to satisfy the standard of cold flow property as a base stock for liquid fuel of the gas oil fraction obtained from the produced oil, it is necessary to convert a certain proportion or more of normal paraffins in the raw middle distillate to isoparaffins (for example, it is preferable that the $C_{18}$ isomer ratio be 85% or more.).

On the other hand, in hydrotreating of the raw middle distillate, a cracking reaction (hydrocracking reaction) of hydrocarbons occurs as a side reaction. This cracking reaction allows carbon-carbon double bonds of hydrocarbons to be cleaved, thereby producing hydrocarbons with a small number of carbon atoms. Therefore, if this cracking reaction occurs predominantly, the production of light hydrocarbons is increased, and the yield of the middle distillate (boiling point range, of approximately 150 to 360° C.), above all, the yield of the gas oil fraction (boiling point range of approximately 250 to 360° C.) is decreased.

The product ejected from the middle distillate hydrotreating reaction apparatus 32 is introduced to the gas liquid separator 42, and separated into a liquid product (liquid hydrocarbons) and a gaseous component containing unreacted hydrogen gas and gaseous hydrocarbons as main components. The liquid hydrocarbons are introduced to the second fractionator 60 downstream, and the gaseous component is reused in the hydroprocessing reaction.

Next, hydrotreating of the naphtha fraction will be described with reference to FIG. 1.

Raw naphtha discharged from the top of the first fractionator 20 is mixed with hydrogen gas through the line 2, heated to a reaction temperature, fed to the naphtha fraction hydrotreating reaction apparatus 30, and hydrotreated.

As a hydrotreating catalyst packed in the naphtha fraction hydrotreating reaction apparatus 30, a known hydrotreating catalyst can be used, but the hydroprocessing catalyst of the present embodiment may be also used. In the naphtha fraction hydrotreating reaction apparatus 30, olefins contained in the raw naphtha fraction is converted to saturated hydrocarbons by hydrogenating, and oxygen-containing compounds such as alcohols are converted to hydrocarbons, water and the like by hydro-deoxidizing. It is to be noted that the raw naphtha fraction is hydrocarbons with a number of carbon atoms of approximately 10 or less, and has characteristics that hydro-isomerizing and hydrocracking hardly occur.

Olefins and oxygen-containing compounds such as alcohols are contained in the raw naphtha fraction at a relatively high concentration, and high reaction heat are generated in the hydrotreating reaction in which they are converted to saturated hydrocarbons. Therefore, if only the raw naphtha fraction is subjected to hydrotreating, the temperature of the naphtha fraction in the naphtha fraction hydrotreating reaction apparatus 30 is excessively raised in some cases. Then, preferably, a part of the hydrotreated naphtha fraction to be ejected from the naphtha fraction hydrotreating reaction apparatus 30 is recycled to the line 2 upstream of the naphtha fraction hydrotreating reaction apparatus 30 by a line 14, thereby diluting the raw naphtha fraction with the treated naphtha fraction, and subjecting it to hydrotreating.

A reaction temperature in the naphtha fraction hydrotreating reaction apparatus 30 is 180 to 400° C., preferably 280 to 350° C., and still more preferably 300 to 340° C. Here, the reaction temperature refers to an average temperature of the catalyst bed in the naphtha fraction hydrotreating reaction apparatus 30. If the reaction temperature is the lower limit temperature or higher, the raw naphtha fraction is sufficiently hydrotreated, and if it is the upper limit temperature or lower, decrease in life time of the catalyst is suppressed.

A pressure (hydrogen partial pressure) in the naphtha fraction hydrotreating reaction apparatus 30 is preferably 0.5 to 12 MPa, and more preferably 1 to 5 MPa. If the pressure is 0.5 MPa or higher, the raw naphtha fraction is sufficiently hydrotreated, and if it is 12 MPa or lower, facility cost to enhance pressure resistance of the facility can be suppressed.

A liquid hourly space velocity (LHSV) in the naphtha fraction hydrotreating reaction apparatus 30 is preferably 0.1 to 10 $h^{-1}$ and more preferably 0.3 to 3.5 $h^{-1}$. If the LHSV is 0.1 $h^{-1}$ or higher, a volume of a reactor is not necessarily too large, and if it is 10 $h^{-1}$ or lower, the raw naphtha fraction is efficiently hydrotreated.

The ratio of hydrogen gas/oil in the naphtha fraction hydrotreating reaction apparatus 30 is preferably 50 to 1000 NL/L, and more preferably 70 to 800 NL/L. Here, "NL" means a hydrogen capacity (L) at the normal state (0° C., 101325 Pa). If the ratio of hydrogen gas/oil is 50 NL/L or higher, the raw naphtha fraction is sufficiently hydrotreated, and if it is 1000 NL/L or lower, a facility for feeding a large amount of hydrogen gas is made redundant, and increase in operation cost can be suppressed.

The produced oil ejected from the naphtha fraction hydrotreating reaction apparatus 30 is separated into a gaseous component containing unreacted hydrogen gas as a main component and liquid hydrocarbons in the gas liquid separator 40. The gaseous component is reused in the hydroprocessing reaction, the liquid hydrocarbons are fed to the naphtha stabilizer 5 through the line 5, gaseous hydrocarbons of $C_4$ or less is removed from the line 8, and the naphtha fraction containing mainly $C_5$ to $C_{10}$ is stored in the naphtha tank 70 through the line 9.

Next, hydrocracking of the wax fraction will be described with reference to FIG. 1.

The raw wax fraction discharged from the bottom of the first fractionator 20 by the line 4 is mixed with an uncracked wax (described later in detail) recycled by the line 13 connected to the line 4 and hydrogen gas, heated to a reaction temperature, fed to the wax fraction hydrocracking reactor 34, and hydrocracked.

As a hydrocracking catalyst packed in the wax fraction hydrocracking reactor 34, a known hydrocracking catalyst can be used, but the hydrocracking catalyst of the present embodiment may be also used.

A mixture of the raw wax fraction and the uncracked wax (hereinafter, also referred to as "wax to be processed" in some cases) is hydrocracked in the wax fraction hydrocracking reaction apparatus 34, and converted to a component corresponding to the middle distillate. At this time, olefins contained in the raw wax fraction are hydrogenated to be converted to paraffin hydrocarbons, and oxygen-containing compounds such as alcohols are hydro-deoxidized to be converted to paraffin hydrocarbons, water and the like. Moreover, at the same time, the production of isoparaffins by hydro-isomerizing normal paraffins contributing to enhancing the cold flow property as the base stock for fuel oil also proceeds. Moreover, a part of a wax to be processed excessively undergoes hydrocracking, and the wax is converted to hydrocarbons corresponding to the naphtha fraction with a lower boiling point than a boiling point range of hydrocarbons corresponding to the middle distillate intended. Moreover, a part of the wax to be processed is further hydrocracked, and converted to gaseous hydrocarbons with a number of carbon atoms of 4 or less, such as butanes, propane, ethane, and methane. On the other hand, a part of the wax to be processed is not sufficiently hydrocracked, and ejected as the uncracked wax from the wax fraction hydrocracking reaction apparatus 34.

In hydrocracking of the wax to be processed in the wax fraction hydrocracking reaction apparatus 34, it is desirable that a "cracking rate" defined by the formula (1) be 50 to 90%, and preferably 60 to 80%.

$$\begin{aligned}\text{Cracking rate(\%)} = &[(\text{mass of hydrocarbons with boiling point of higher than 360° C. in unit mass of}\\&\text{wax to be processed}) - (\text{mass of hydrocarbons}\\&\text{with boiling point of higher than 360° C. in}\\&\text{unit mass of hydrocracking product})] \times 100/\\&(\text{mass of hydrocarbons with boiling point of}\\&\text{higher than 360° C. in unit mass of wax to be}\\&\text{processed})\end{aligned} \qquad (1)$$

If the cracking rate is less than 50%, the wax to be processed is not sufficiently hydrocracked, and a ratio of a fraction with a boiling point range corresponding to a boiling point range of the middle distillate occupied in the hydrocracking product is decreased. On the other hand, if the cracking rate is more than 90%, the wax to be processed is excessively cracked, the production of hydrocarbons with a lower boiling point than the lower limit of the boiling point range of the middle distillate is increased, and a ratio of the middle distillate occupied in the cracking product is decreased. The cracking rate is generally controlled by the reaction temperature in the wax fraction hydrocracking reaction apparatus 34.

It is to be noted that the "uncracked wax" refers to one in the wax to be processed, in which hydrocracking does not proceed to a boiling point of 360° C. or lower. The uncracked wax is separated as a bottom oil in the second fractionator 60 described later, and recycled to the wax fraction hydrocracking reaction apparatus 34. Moreover, the "hydrocracking product" means all products containing the uncracked wax ejected from the wax fraction hydrocracking reactor 34, unless otherwise specified.

Examples of the reaction temperature (catalyst bed weight average temperature) in the wax fraction hydrocracking reactor 34 can include 180 to 400° C., 200 to 370° C. is preferable, 250 to 350° C. is more preferable, and 280 to 350° C. is still more preferable. If the reaction temperature is higher than 400° C., hydrocracking tends to excessively proceed to decrease the yield of the middle distillate intended. Moreover, the hydrocracking product is colored and restricted for use as the base stock for fuel oil, in some cases. On the other hand, if the reaction temperature is lower than 180° C., hydrocracking of the wax fraction tends not to proceed to decrease the yield of the middle distillate. Moreover, olefins and oxygen-containing compounds such as alcohols in the wax fraction tend not to be sufficiently removed.

Examples of the hydrogen partial pressure in the wax fraction hydrocracking reactor 34 include 0.5 to 12 MPa, and 1.0 to 5.0 MPa is preferable.

Examples of the liquid hourly space velocity (LHSV) in the wax fraction hydrocracking reactor 34 include 0.1 to 10.0 $h^{-1}$, and 0.3 to 3.5 $h^{-1}$ is preferable. A ratio of hydrogen gas to the wax fraction (ratio of hydrogen gas/oil) is not particularly limited, but examples thereof include 50 to 1000 NL/L, and 70 to 800 NL/L is preferable.

A hydrocracking product ejected from the wax fraction hydrocracking reaction apparatus 34 is separated in the gas liquid separator 44 into gas and liquid. Namely, the hydrocracking product is separated into a gaseous component containing unreacted hydrogen gas and hydrocarbon gas mainly of $C_4$ or less, and a liquid component which is a hydrocarbon oil with a carbon number distribution corresponding to those from the naphtha fraction to the uncracked wax. The gaseous component obtained by separation is reused in the hydroprocessing reaction. The liquid component is mixed with the hydrotreating product of the middle distillate fed from the middle distillate hydrotreating reaction apparatus 32 through the gas liquid separator 42, and fed to the second fractionator 60.

In the second fractionator 60, a plurality of cut points are set depending on the hydrocarbon oil to be discharged, and a mixed oil comprising the hydrotreating product of the middle distillate fed from the middle distillate hydrotreating reaction apparatus 32 and the hydrocracking product of the wax fraction fed from the wax fraction hydrocracking reaction apparatus 34 is fractionated.

In the present embodiment, the cut points can be set to 150° C., 250° C. and 360° C. The light fraction containing the naphtha fraction is discharged by the line 10 from the top of the second fractionator 60, and fed to the naphtha stabilizer 50, and hydrocarbon gas of $C_4$ or less is removed, and stored in the naphtha tank 70 as product naphtha. A kerosene fraction is discharged by the line 11 from the middle of the second fractionator 60, and stored in the kerosene tank 72. A gas oil fraction is discharged by the line 12 from the lower portion of the second fractionator 60, and stored in the gas oil tank 74. A bottom oil containing the uncracked wax as a main component is discharged by the line 13 from the bottom of the second fractionator 60, recycled to the line 4, fed with the raw wax fraction to the wax fraction hydrocracking reaction apparatus 34 and hydrocracked again.

As described above, the gas oil fraction, the kerosene fraction, and the naphtha fraction are obtained.

The method for producing a hydrocarbon oil of the present invention is not limited to the examples of the above-described embodiment, and various alterations, additions and the like can be made without departing from the spirit of the present invention.

For example, the FT synthetic oil fed from the FT synthesis reaction apparatus is fractionated to the raw naphtha fraction, the raw middle distillate and the raw wax fraction in the first fractionator 20 in the above-described embodiment, but in this fractionating, the raw naphtha fraction and the raw middle distillate may be fractionated as one fraction of a raw naphtha-middle distillate. Then, the raw naphtha-middle distillate may be subjected to hydrotreating in a single hydrotreating reaction apparatus packed with the hydroprocessing catalyst of the present invention.

Furthermore, the FT synthetic oil may be separated into gas and liquid at a temperature in the FT synthesis reaction apparatus without being fractionated in the first fractionator 20, to be separated into light liquid hydrocarbons liquefied by cooling light hydrocarbons which is gaseous at the temperature, and heavy liquid hydrocarbons which is liquid at the temperature. Then, without providing the naphtha fraction hydrotreating reaction apparatus 30, the light liquid hydrocarbons may be subjected to hydrotreating in the middle distillate hydrotreating reaction apparatus 32 packed with the hydroprocessing catalyst of the present invention, and the heavy liquid hydrocarbons may be subjected to hydrocracking in the wax fraction hydrocracking reaction apparatus 34.

Moreover, the mixture of the hydrotreated middle distillate to be ejected from the middle distillate hydrotreating reaction apparatus 32 and the hydrocracking product of the wax fraction to be ejected from the wax fraction hydrocracking reaction apparatus 34 is fractionated in the second fractionator 60 in the above-described embodiment, but the present embodiment is not limited thereto, and for example, the hydrotreated middle distillate to be ejected from the middle distillate hydrotreating reaction apparatus 32 and the hydrocracking product of the wax fraction to be ejected from the wax fraction hydrocracking reaction apparatus 34 may be individually fractionated in a separate fractionator.

Moreover, the naphtha fraction, the kerosene fraction, and the gas oil fraction are obtained as products in the above-described embodiment, but each of the kerosene fraction and the gas oil fraction may be recovered as one fraction (middle distillate).

In the foregoing, the suitable embodiment of the present invention is described, but the present invention is not intended to be limited to the above-described embodiment. For example, the present invention may be a method for selecting a catalyst support in which a content of a carbonaceous substance containing carbon atoms in terms of carbon atoms is measured and a catalyst support in which the content is 0.5% by mass or less is selected.

EXAMPLES

Hereinafter, the present invention will be more specifically described by Examples, but it is not intended to be limited to Examples.

Example 1

(Preparation of Hydrocracking Catalyst)

A kneaded product was prepared by adding water to a mixture of 30% by mass of silica alumina, 10% by mass of USY zeolite, and 60% by mass of an alumina binder, kneading it into a clay-like state, and thereafter adding 5% by mass of a starch as a molding additive, per the total mass of silica alumina, USY zeolite, and the alumina binder, and then kneading further.

This kneaded product was molded by extrusion molding to a form of cylinder with a diameter of about 1.5 mm and a length of about 3 mm. The obtained mold was dried at 120° C. for 3 hours, and further calcined in air at 500° C. for 3 hours to obtain a catalyst support. A content of a carbonaceous substance containing carbon atoms from starch contained in this catalyst support was measured using carbon/sulfur analyzer EMIA-920V manufactured by HORIBA, Ltd., and as a result, it was 0.2% by mass in terms of carbon atoms based on the mass of the catalyst support.

This catalyst support was immersed in an aqueous solution of 0.8% by mass of dichlorotetraammine platinum (II) as a platinum atom based on the mass of the catalyst support using an incipient wetness method, and this was further dried at 120° C. for 3 hours to obtain a catalyst precursor.

Figure 2:
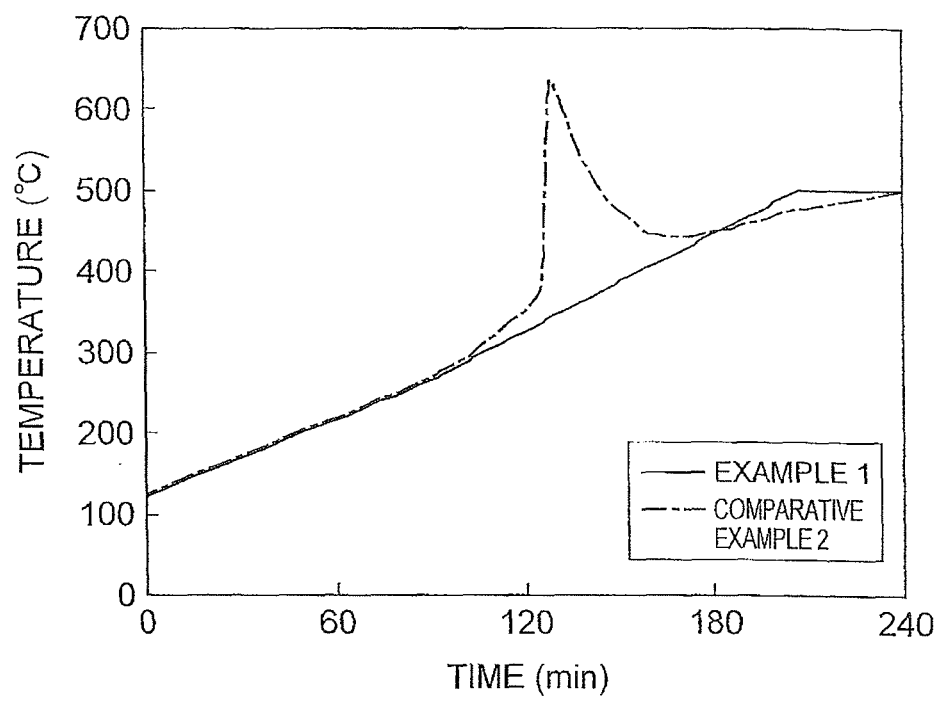
FIG. 2 is a diagram showing a temperature profile in calcining of a catalyst precursor in Example 1 and Comparative Example 2.

Next, the obtained catalyst precursor was charged in a heating furnace, temperature-raised to 500° C. at a rate of temperature rise of 2° C./minute under an air atmosphere, and calcined at the temperature for 1 hour to obtain a hydroprocessing catalyst. FIG. 2 shows a temperature profile in calcining of the catalyst precursor.

(Hydrocracking of Wax Fraction)

The FT synthetic oil obtained by the FT synthesis reaction was fractionated by a fractionator to obtain a bottom oil (raw wax fraction) of the fractionator with a boiling point of higher than 360° C. Distribution of carbon of the raw wax fraction was investigated by a distillation gas chromatographic method, and it was in the range of $C_{22}$ to $C_{82}$. This raw wax fraction was used as a feed oil to be hydrocracked.

The obtained hydrocracking catalyst as described above was packed in a fixed bed flow reactor, and reduced under a stream of hydrogen at 340° C. for 4 hours to be activated.

Next, the raw oil was fed with hydrogen gas to the reactor packed with the hydrocracking catalyst to be hydrocracked. The hydrocracking product ejected from the reactor was cooled, unreacted hydrogen gas and gaseous hydrocarbons mainly of $C_4$ or less were separated therefrom in the gas liquid separator, and liquid hydrocarbons were fed to the fractionator and fractionated with the cut points being set at 150° C. and 360° C. Then, all the bottom oils of the fractionator were recycled to a line for feeding the raw oil to the reactor. The reaction conditions were as follows: the reaction pressure (pressure of hydrogen gas) was 4.0 MPa, the LHSV was 2.0 h$^{-1}$, and the ratio of hydrogen/oil was 680 NL/L.

The hydrocracking product (before fractionating) to be ejected from the reactor was analyzed by a gas chromatographic method, and the cracking rate defined by the formula (1) and a middle distillate selecting rate defined by the formula (2) were calculated. Then, the reaction temperature was adjusted so that the cracking rate was 80%.

Cracking rate(% by mass)=[(mass of hydrocarbons with boiling point of higher than 360° C. in unit mass of wax to be processed)−(mass of hydrocarbons with boiling point of higher than 360° C. in unit mass of hydrocracking product)]×100/(mass of hydrocarbons with boiling point of higher than 360° C. in unit mass of wax to be processed)    (1)

Middle distillate selecting rate(% by mass)=[(mass of hydrocarbons with boiling point of 150 to 360° C. in unit mass of hydrocracking product)−(mass of hydrocarbons with boiling point of 150 to 360° C. in unit mass of wax to be processed)]×100/[(mass of hydrocarbons with boiling point of higher than 360° C. in unit mass of wax to be processed)−(mass of hydrocarbons with boiling point of higher than 360° C. in unit mass of hydrocracking product)]    (2)

Here, the "wax to be processed" in the formulae (1) and (2) means a mixture of the raw wax fraction fed to the reactor and the bottom oil of the fractionator to be recycled.

When 200 hours elapsed after starting of the operation, the reaction temperature at which the cracking rate was 80% by mass was 315° C., and the middle distillate selecting rate was 79% by mass. The results are shown in Table 1.

Comparative Example 1

(Preparation of Hydrocracking Catalyst)

A catalyst support was obtained as in Example 1 except that the catalyst support was calcined at 500° C. for 1 hour. The content of the carbonaceous substance containing carbon atoms from starch contained in this catalyst support was 0.6% by mass in terms of carbon atoms based on the mass of the catalyst support.

By this catalyst support was supported platinum, and dried and calcined as in Example 1 to obtain a hydroprocessing catalyst.

During the calcining, abnormal heat generation was observed.

(Hydrocracking of Wax Fraction)

Hydrocracking of the raw wax fraction from the FT synthetic oil was carried out as in Example 1 except that the obtained hydrocracking catalyst as described above was used with being packed in the reactor.

When 200 hours elapsed after starting of the operation, the reaction temperature at which the cracking rate was 80% by mass was 315° C., and the middle distillate selecting rate was 65% by mass. The results are shown in Table 1.

Comparative Example 2

(Preparation of Hydrocracking Catalyst)

A catalyst support was obtained as in Example 1 except that the catalyst support was calcined at 450° C. for 3 hours. The content of the carbonaceous substance containing carbon atoms from starch contained in this catalyst support was 0.8% by mass in terms of carbon atoms based on the mass of the catalyst support.

By this catalyst support was supported platinum, and dried and calcined as in Example 1 to obtain a hydrocracking catalyst. FIG. 2 shows a temperature profile in calcining of a precursor.

(Hydrocracking of Wax Fraction)

Hydrocracking of the raw wax fraction from the FT synthetic oil was carried out as in Example 1 except that the obtained hydrocracking catalyst as described above was used with being packed in the reactor.

When 200 hours elapsed after starting of the operation, the reaction temperature at which the cracking rate was 80% by mass was 315° C., and the middle distillate selecting rate was 61% by mass. The results are shown in Table 1.

TABLE 1

|  | Example 1 | Comparative example 1 | Comparative example 2 |
|---|---|---|---|
| Reaction temperature at which cracking rate was 80% by mass (° C.) | 315 | 315 | 315 |

TABLE 1-continued

| | Example 1 | Comparative example 1 | Comparative example 2 |
|---|---|---|---|
| Middle distillate selecting rate (% by mass) | 79 | 65 | 61 |

It has been revealed from these results that when the catalyst precursor constituted from the catalyst support in which the content of the carbonaceous substance containing carbon atoms is more than 0.5% by mass in terms of carbon atoms is calcined, abnormal heat generation occurs during temperature rising. The middle distillate selectivity of the consequently obtained hydrocracking catalyst is low. On the other hand, when the content of the carbonaceous substance containing carbon atoms is 0.5% by mass or lower in terms of carbon atoms, the abnormal heat generation as described above does not occur even if the catalyst precursor is calcined by temperature-rising at the same rate of temperature rise, and the obtained hydrocracking catalyst gives a high middle distillate selectivity.

INDUSTRIAL APPLICABILITY

According to the present invention, a method for producing a hydroprocessing catalyst that can stably produce a hydroprocessing catalyst which has a high dispersibility of an active metal and which is excellent in middle distillate selectivity is provided.

REFERENCE SIGNS LIST

20 . . . first fractionator, 30 . . . naphtha fraction hydrotreating reaction apparatus, 32 . . . middle distillate hydrotreating reactor, 34 . . . wax fraction hydrocracking reactor, 50 . . . second fractionator, 100 . . . apparatus for producing hydrocarbon oil

The invention claimed is:

1. A method for producing a hydroprocessing catalyst comprising:
   (A) preparing a catalyst support comprising a USY-type zeolite and one or more selected from silica alumina, alumina boria, and silica zirconia, and not supporting an active metal element selected from palladium and platinum, which contains a carbonaceous substance containing carbon atoms and the content of the carbonaceous substance is 0.5% by mass or less in terms of carbon atoms,
   (B) supporting an active metal component containing at least one active metal element selected from palladium and platinum on the catalyst support to obtain a catalyst precursor; and
   (C) calcining the catalyst precursor to obtain the hydroprocessing catalyst.

2. A method for producing a hydroprocessing catalyst, comprising:
   (A) molding a kneaded product containing a metal oxide and a molding additive having carbon atoms to obtain a molded product,
   (B) calcining the molded product to obtain a catalyst support comprising a USY-type zeolite and one or more selected from silica alumina, alumina boria, and silica zirconia, and without supporting an active metal element selected from palladium and platinum, which contains a carbonaceous substance containing carbon atoms and the content of the carbonaceous substance is 0.5% by mass or less in terms of carbon atoms,
   (C) supporting an active metal component containing at least one active metal element selected from palladium and platinum on the catalyst support to obtain a catalyst precursor; and
   (D) calcining the catalyst precursor to obtain the hydroprocessing catalyst.

* * * * *